United States Patent
Yashiro et al.

(10) Patent No.: US 8,653,779 B2
(45) Date of Patent: Feb. 18, 2014

(54) ROTATING ELECTRICAL-MACHINE CONTROL SYSTEM AND METHOD OF OPERATING MAGNET TEMPERATURE OF ROTATING ELECTRICAL-MACHINE

(75) Inventors: Takahisa Yashiro, Toyota (JP); Hiroki Kato, Toyota (JP); Kentaro Haruno, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 70 days.

(21) Appl. No.: 13/514,485

(22) PCT Filed: May 25, 2010

(86) PCT No.: PCT/JP2010/058790
§ 371 (c)(1),
(2), (4) Date: Jun. 7, 2012

(87) PCT Pub. No.: WO2011/148457
PCT Pub. Date: Dec. 1, 2011

(65) Prior Publication Data
US 2012/0242268 A1    Sep. 27, 2012

(51) Int. Cl.
*H02P 3/00* (2006.01)
*G05B 19/10* (2006.01)
*G05B 11/28* (2006.01)
*H02P 27/04* (2006.01)

(52) U.S. Cl.
USPC ........... 318/503; 318/494; 318/567; 318/599; 318/801

(58) Field of Classification Search
USPC .......................... 318/494, 503, 567, 599, 801
See application file for complete search history.

(56) References Cited

U.S. PATENT DOCUMENTS

| | | | |
|---|---|---|---|
| 6,100,687 A * | 8/2000 | Weitekamp et al. | 324/300 |
| 6,335,606 B1 * | 1/2002 | Minagawa et al. | 318/801 |
| 7,688,018 B2 * | 3/2010 | Goto et al. | 318/599 |
| 2003/0076065 A1 * | 4/2003 | Shafer et al. | 318/567 |
| 2004/0014236 A1 * | 1/2004 | Albo et al. | 436/173 |
| 2005/0073280 A1 * | 4/2005 | Yoshinaga et al. | 318/727 |

FOREIGN PATENT DOCUMENTS

| | | |
|---|---|---|
| JP | 2006-254521 A | 9/2006 |
| JP | 2008-178166 A | 7/2008 |
| JP | 2008-206338 A | 9/2008 |
| JP | 2009-189181 A | 8/2009 |
| JP | 2009-273247 A | 11/2009 |
| JP | 2010-041869 A | 2/2010 |

OTHER PUBLICATIONS

International Search Report of PCT/JP2010/058790 mailed Aug. 31, 2010

* cited by examiner

*Primary Examiner* — Lincoln Donovan
*Assistant Examiner* — Gabriel Agared
(74) *Attorney, Agent, or Firm* — Kenyon & Kenyon LLP

(57) ABSTRACT

A rotating electrical-machine control system is provided with: a rotating electrical-machine comprising a rotor further comprising permanent magnets that are divided into a dividing-number of sections; an inverter circuit that drives the rotating electrical-machine by PWM control, using a carrier wave having a carrier frequency; a storage unit that has stored therein a relationship file that indicates the relationship between the dividing-number of the magnets, the magnet temperature, and the carrier frequency; and a control apparatus. The control apparatus comprises a condition acquisition processing unit for acquiring the target magnet temperature, a rotational-speed acquisition processing unit for acquiring the rotational speed of the rotating electrical-machine, and a carrier-frequency setup processing unit for providing the dividing-number of the magnets and the target magnet temperature to the storage unit and conducting a search therein, and giving the corresponding carrier frequency to an inverter control unit as an instruction.

4 Claims, 4 Drawing Sheets

ROTATING ELECTRICAL-MACHINE CONTROL SYSTEM AND METHOD OF OPERATING MAGNET TEMPERATURE OF ROTATING ELECTRICAL-MACHINE

This is a 371 national phase application of PCT/JP2010/058790 filed 25 May 2010, the contents of which are incorporated herein by reference.

TECHNICAL FIELD

The present invention relates to a rotating electrical-machine control system and a method of operating a magnet temperature of a rotating electrical-machine. In particular, the present invention relates to a rotating electrical-machine control system which controls a magnet temperature of a rotating electrical-machine having a magnet and a method of operating the magnet temperature of the rotating electrical-machine.

BACKGROUND ART

In a rotating electrical-machine having a rotor including a permanent magnet, temperature characteristics of the permanent magnet are sometimes problematic. For example, Patent Document 1 points out that, concerning a drive controller for a rotating electrical-machine, ripples in an output current of an inverter differ according to a carrier frequency, and that heat generation in a magnet of the rotating electrical-machine differs according to the magnitude of ripples in the output current. This document describes that the carrier frequency is changed according to the temperature of the magnet. Similarly, Patent Document 2 describes that the carrier frequency is changed according to the temperature of the magnet.

Patent Document 3 discloses, as a rotating electrical-machine, a configuration in which, in order to suppress increase of induced electromotive force due to the temperature of the permanent magnet, a rotor is divided into an outer circumference rotating part having a permanent magnet and a coil, and an internal circumference rotating part located inside the outer circumference rotating part, and switching is possible between an integral rotation state, in which the outer circumference rotating part and the internal circumference rotating part rotate integrally, and a relative rotation state in which the outer circumference rotating part and the internal circumference rotating part rotate relatively to each other to thereby cause changes in magnetic flux passing through a coil of the outer circumference rotating part resulting in heating of the coil by electromagnetic induction.

CITATION LIST

Patent Document

Patent Document 1: JP 2008-206338 A
Patent Document 2: JP 2009-189181 A
Patent Document 3: JP 2009-273247 A

SUMMARY OF INVENTION

Technical Problem

As described above, the magnetic flux density of a magnet has temperature characteristics. For example, a neodymium magnet has high-temperature demagnetization characteristics in which the magnetic flux density decreases as the temperature rises. Meanwhile, requirements for a magnet differ depending on the operational state of the rotating electrical-machine, as described below.

For example, when the rotating electrical-machine is required to have a low rotational speed and a high torque, a drive current is increased, and as a result copper loss, which is loss due to coil resistance, becomes dominant. Further, as the magnetic flux density of the magnet becomes larger, torque can be generated more easily, and it is therefore preferable to maintain the magnetic flux density while reducing eddy current loss around the magnet. One of the methods to reduce eddy current loss around the magnet is dividing the magnet to thereby reduce the eddy current. For this purpose, divided magnets are used.

On the other hand, when the rotating electrical-machine is required to have a high rotational speed and a low torque, iron loss due to the eddy current generated in the magnet becomes dominant. Because iron loss becomes larger as the magnetic flux density of the magnet increases, it is preferable for the magnetic flux density of the magnet to be small.

As such, when a low rotational speed and a high torque is required, it is preferable for the magnetic flux density of the magnet to be large, while when a high rotational speed and a low torque is required, it is preferable for the magnetic flux density of the magnet to be small. Because the magnetic flux density of the magnet is determined by the quality of the magnet material, it is not easy to satisfy both of these contradictory requirements. In particular, when a method of maintaining the magnetic flux density by reducing eddy current loss using the divided magnets is adopted, the magnetic flux density cannot be reduced easily without adding modifications to the method.

The advantage of the present invention is providing a rotating electrical-machine control system which enables changes of the magnetic flux density of divided magnets according to the operational state of a rotating electrical-machine. Further, another advantage of the present invention is providing a rotating electrical-machine control system which can manipulate the magnet temperature of the divided magnets, and a method of operating the magnet temperature of the rotating electrical-machine, in order to change the magnetic flux density of the divided magnets of the rotating electrical-machine. The following solutions contribute to at least one of the above-described advantages.

Solution to Problem

The present invention is based on a finding observed in the study of eddy current loss in a rotating electrical-machine in which the divided magnets are used. The finding is that within the range in which the frequency of the magnetic field generating the eddy current remains low, there is the effect that the eddy current loss becomes lower as the number of divided magnets is increased, while if the frequency of the magnetic field is increased, the eddy current loss increases as the number of divided magnets is increased, because of the concentration of the eddy current on the surface caused by the tradeoff between the size of the divided magnets and the skin effect.

In other words, the frequency of the magnetic field which generates the eddy current is related to a carrier frequency of an inverter circuit which drives the rotating electrical-machine, and when the carrier frequency is increased and the number of divided magnets is large, the eddy current on the surface increases and produces heat, thereby increasing the temperature. In doing so, it is possible to reduce the magnetic flux density. Therefore, by acquiring the relationship among the number of divided magnets, the magnet temperature, and the carrier frequency in advance, providing the number of divided magnets to thereby set a target magnet temperature according to the operational state of the rotating electrical-machine, and causing the inverter circuit to operate at a carrier frequency corresponding to this target magnet temperature, it is possible to, for example, increase the magnetic temperature to thereby reduce the magnetic flux density when the rotational speed is high and the torque is low, and reduce the magnet temperature to thereby increase the magnetic flux density when the rotational speed is low and the torque is high. This finding is embodied in the following solution.

A rotating electrical-machine control system according to the present invention has a feature of providing a rotating electrical-machine having a rotor including divided magnets, an inverter circuit which drives the rotating electrical-machine by PWM control using a carrier wave having a carrier frequency, a condition acquisition processing unit which acquires a target magnet temperature of the magnets of the rotating electrical-machine, a storage unit which stores a relationship among the number of divided magnets, a magnet temperature, and the carrier frequency, and a carrier frequency setup processing unit which provides the number of divided magnets and the target magnet temperature to thereby search the storage unit, and sets a corresponding carrier frequency as a carrier wave frequency of the inverter circuit.

Further, in the rotating electrical-machine control system according to the present invention, the rotating electrical-machine contains the magnets having high-temperature demagnetization characteristics, and a rotational speed acquisition processing unit which acquires the rotational speed of the rotating electrical-machine is further provided. It is desirable that the carrier frequency setup processing unit sets a higher target magnet temperature as the rotational speed increases.

A method for operating a magnet temperature of a rotating electrical-machine according to the present invention has a feature of providing a condition acquiring step of acquiring a target magnet temperature of a magnet of the rotating electrical-machine, and a carrier frequency setup step of providing a number of divided magnets and the target magnet temperature, searching a storage unit storing a relationship among the number of divided magnets, a magnet temperature, and a carrier frequency, and sets up a corresponding carrier frequency as a carrier wave frequency of an inverter circuit connected to the rotating electrical-machine.

Further, in the method of operating the magnet temperature of the rotating electrical-machine according to the present invention, it is desirable that in the carrier frequency setup step, a carrier frequency provided when the rotating electrical-machine is at a high rotational speed and a low torque is set differently from a carrier frequency provided when the rotating electrical-machine is at a low rotational speed and a high torque.

Advantageous Effect of Invention

According to at least one of the above-described configurations, the rotating electrical-machine control system acquires a target magnet temperature of the magnet of the rotating electrical-machine, searches a storage unit storing a relation among the number of divided magnets, the magnet temperature, and the carrier frequency, and sets a carrier frequency corresponding to the number of divided magnets and the target magnet temperature, as a frequency of a carrier wave of the inverter circuit. By changing the magnet temperature in this manner, it is possible to achieve a desired magnet temperature and a magnet having a desired magnetic flux density.

Further, when, in the rotating electrical-machine control system, the rotating electrical-machine includes a magnet having a high-temperature demagnetization characteristic, the rotational speed of the rotating electrical-machine is acquired, and the carrier frequency is set so that the target magnet temperature increases as the rotational speed increases. In doing so, it is possible to reduce the magnetic flux density of the magnet when the rotational speed is high, thereby reducing iron loss and improving the efficiency.

Further, according to at least one of the above-described embodiments, the method of operating a magnet temperature of the rotating electrical-machine includes the steps of acquiring a target magnet temperature of the magnet of the rotating electrical-machine, providing the number of divided magnets and the target magnet temperature, to thereby search a storage unit storing a relation among the number of divided magnets, the magnet temperature, and the carrier frequency, and setup a corresponding carrier frequency as a frequency of a carrier wave of the inverter circuit connected to the rotating electrical-machine. The magnet temperature can be manipulated by changing the carrier frequencies in this manner.

In addition, because, in the method of operating a magnet temperature of the rotating electrical-machine, the rotating electrical-machine makes a carrier frequency used when the rotational speed is high and the torque is low different from a carrier frequency used when the rotational speed is low and the torque is high, it is possible to optimize the magnet temperature according to the operational state of the rotating electrical-machine, thereby improving the efficiency.

DESCRIPTION OF EMBODIMENTS

Embodiments of the present invention will be described in detail below with reference to the drawings. A rotating electrical-machine mounted on a vehicle will be described as a rotating electrical-machine. This is because a running state of the vehicle is used as an example of an operational state of the rotating electrical-machine, and therefore, a rotating electrical-machine other than the rotating electrical-machine mounted on the vehicle may also be used. The rotating electrical-machine only has to have a rotor including a magnet, and therefore, for example, a stationary rotating electrical-machine may also be used.

In addition, although the description will be given on the assumption that the rotating electrical-machine control system includes a single rotating electrical-machine, this is an example for illustrative purposes, and therefore, the rotating electrical-machine control system may include a plurality of rotating electrical-machines. Further, in the description, a rectangular permanent magnet included in the rotor of the rotating electrical-machine along the axis direction of the rotor is divided into a plurality of portions. The shape, the size, and the number of divided permanent magnets are examples for illustrative purposes, and therefore, other configurations may also be used.

Further, although the description will be given on the assumption that a power circuit included in the rotating electrical-machine control system contains an electrical storage device, a voltage converter, and an inverter circuit, these are only main components and components other than these may also be contained. For example, a low-voltage inverter circuit, a system main relay, and a DC/DC converter, etc. may also be contained.

Hereinafter, components that are common to all the figures are assigned the same codes and their overlapping description will be omitted. Further, in the context of the description, references that are described before that context are used as necessary.

Figure 1:
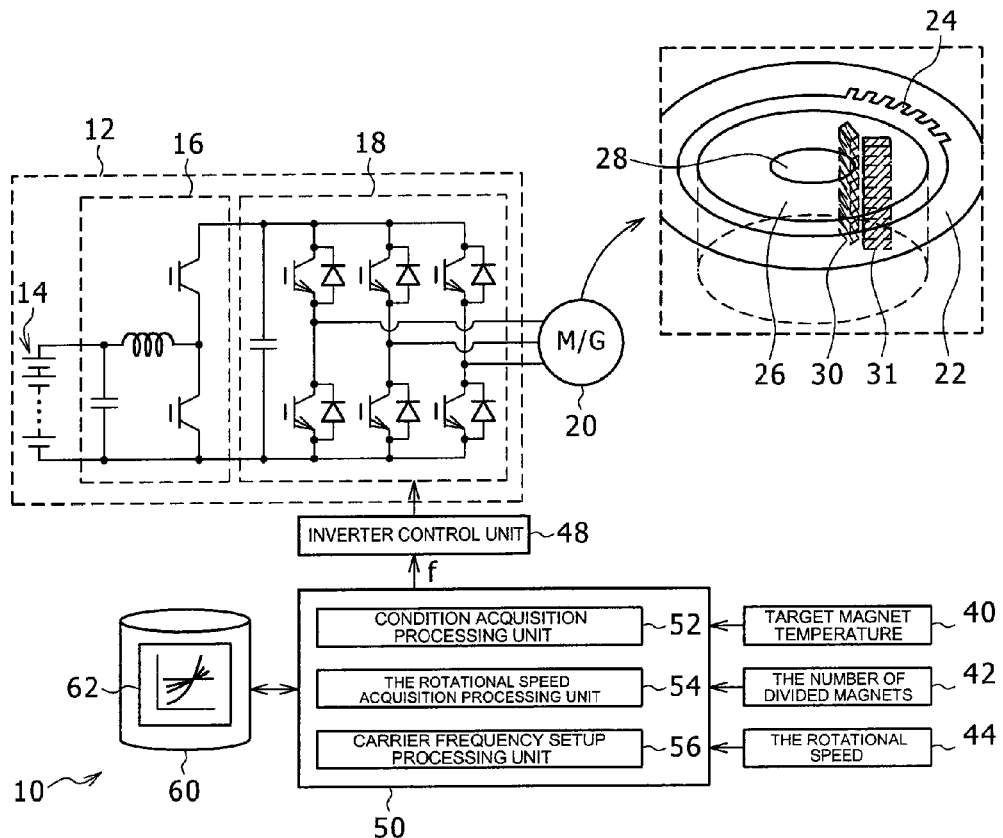
FIG. 1 shows a diagram illustrating a configuration of a rotating electrical-machine control system according to an embodiment of the present invention.

FIG. 1 shows a diagram illustrating a configuration of a rotating electrical-machine control system 10. This rotating electrical-machine control system 10 performs control including the operation of the rotating electrical-machine 20 mounted on a hybrid vehicle. The rotating electrical-machine control system 10 is configured to include a rotating electrical-machine 20, a power circuit 12 connected to this rotating electrical-machine 20, a controller 50, and a storage unit 60 connected to the controller 50.

The rotating electrical-machine 20 is a three-phase synchronization rotating electrical-machine which is provided as a motor generator (M/G) mounted on a vehicle, and functions as a motor when power is supplied from the power circuit 12 side and as a generator when it is driven by an engine (not shown) or while the vehicle brakes.

In other words, the rotating electrical-machine 20 functions as a motor using AC power supplied from the power circuit 12 side when the vehicle runs by power. Then, while the vehicle brakes, the rotating electrical-machine 20 functions as a generator to thereby collect regenerative energy and supply the energy to the power circuit 12 side.

FIG. 1 shows a model diagram of a configuration of the rotating electrical-machine 20. The rotating electrical-machine 20 is configured to include a stator 22 as a stator element and a rotor 26 as a rotor element. The stator 22 is provided with a plurality of slots 24. Although FIG. 1 illustrates only part of the slots 24 of the stator 22, a plurality of slots 24 are in fact provided over the entire circumference along the circumferential direction. For example, assume that 48 slots are provided. Naturally, the number of slots here is an example, and therefore some other number of slots may also be used. Three-phase coil wires which are not shown in these slots 24 are wound in a predetermined winding order. A predetermined three-phase drive signal is then applied to the three-phase coil wires, thereby generating a magnetic field for the rotor 26.

A rotating shaft 28 attached to the rotor 26 is an output shaft of the rotating electrical-machine 20. For example, the vehicle can run by delivering an output from this rotating shaft to a drive shaft of the vehicle (not shown).

Permanent magnets 30 and 31 are rectangular magnets embedded along the axial direction of the rotor 26. Although FIG. 1 shows only two permanent magnets 30 and 31 corresponding to the parts of the slots 24 of the stator 22 shown therein, in reality, a plurality of permanent magnets corresponding to the number of the slots 24 of the stator 22 are arranged along the circumferential direction of the rotor 26. For example, eight permanent magnets are arranged for 48 of the slots 24. Naturally, the number of magnets here is also an example, and therefore some other number of magnets may also be used.

Figure 2:
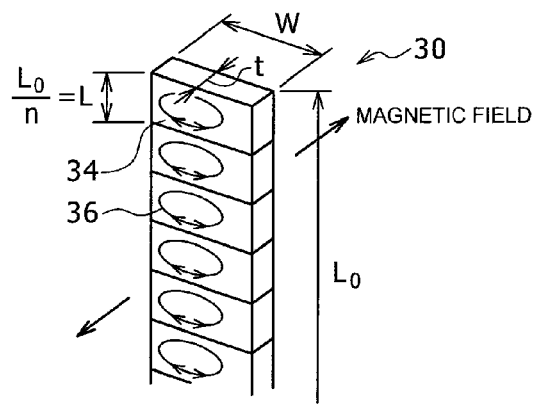
FIG. 2 shows a diagram illustrating the number of divided magnets according to the embodiment of the present invention.

The permanent magnets 30 and 31 are divided magnets which are divided in the axial direction of the rotor 26. FIG. 2 shows divided permanent magnets 30. The permanent magnets 30 have the length $L_0$ in the axial direction of the rotor 26, the width W based on a width direction surface in a direction facing a magnetic field from the stator 22, and a thickness t based on a thickness direction surface in a direction orthogonal to the width direction. This length $L_0$ is divided into n, and each divided magnet 34 has a length $L=(L_0/n)$, a width W, and a thickness t.

When the permanent magnets 30 and 31 receive a magnetic field from the stator 22, an eddy current 36 is generated so as to produce a magnetic field in the opposite direction to cancel the magnetic field. The reason for dividing the permanent magnets 30 and 31 is to suppress loss due to this eddy current 36 as a whole. The relationship among the number of divided magnets n, eddy current loss, and the frequency of the magnetic field will be described below.

Neodymium magnets can be used as the permanent magnets 30 and 31. A neodymium magnet is a magnet which contains neodymium as an element constituting the magnet, and is a powerful magnet having strong magnetic flux density and high coercivity. The neodymium magnet has high-temperature demagnetization characteristics, and therefore the magnetic flux density at a low temperature is higher than that at a high temperature.

Returning to FIG. 1, the power circuit 12 is configured to include an electrical storage device 14, a voltage converter 16, and an inverter circuit 18.

The electrical storage device 14 is a high-voltage secondary battery which can be charged and discharged. For example, a lithium ion battery pack, a nickel hydride battery pack, or a capacitor having a terminal voltage of approximately 200V can be used as the electrical storage device 14. In the battery pack, a plurality of batteries, each referred to as a single cell or a battery cell and having a terminal voltage of one to a few volts, are combined to achieve the above predetermined terminal voltage.

The voltage converter 16 is a circuit positioned between the electrical storage device 14 and the inverter circuit 18 and having a voltage conversion function. The voltage converter 16 can be configured to include, for example, a reactor and a switching element, as shown in FIG. 1. The voltage conversion function has a voltage boosting function of boosting the voltage on the electrical storage device 14 side using the energy storage effect of the reactor to thereby supply the voltage to the inverter circuit 18 side, and a voltage lowering function of lowering the power from the inverter circuit 18 side to thereby supply the power as charging power to the electrical storage device 14 side. The voltage converter 16 contains a smoothing capacitor which suppresses change of voltage and current.

The inverter circuit 18 is a circuit connected to the rotating electrical-machine 20. The inverter circuit 18 is configured to include, for example, a plurality of switching elements and a reverse connected diode, and has a function of performing power conversion between AC power and DC power. In other words, when the rotating electrical-machine 20 is functioning as a generator, the inverter circuit 18 has an AC-DC conversion function of converting AC three-phase regenerative power supplied from the rotating electrical-machine 20 to DC power to thereby supply the DC power to the electrical storage device 14 side as charging power. Further, when the rotating electrical-machine 20 is functioning as a motor, the inverter circuit 18 has an DC-AC conversion function of converting DC power from the electrical storage device 14 side to AC three-phase drive power, to thereby supply the AC power to the rotating electrical-machine 20 as AC drive power. The inverter circuit 18 contains a smoothing capacitor for suppressing change of voltage and current and a discharging resistor for discharging this capacitor.

An inverter control unit 48 is a circuit which generates a voltage command signal for each phase of the inverter based on an operational state of the rotating electrical-machine 20 provided by the controller 50, etc., compares this each-phase-voltage command signal with a given carrier wave signal to thereby generate each-phase PWM signals in the form of pulses, and outputs these each-phase PWM signals to corresponding switching elements of the inverter circuit 18. Here, the carrier wave signal is also referred to as a carrier signal, and, for example, a triangular wave signal is used. A frequency of this carrier signal is referred to as a carrier frequency f, and the carrier frequency f is provided by the controller 50.

The controller 50 has a function of controlling the operation of the components constituting the rotating electrical-machine control system 10 as a whole, and here in particular, the controller 50 has a function of changing the magnetic flux density of the permanent magnets 30 and 31 according to the operational state of the rotating electrical-machine, that is, the running state of the vehicle.

For this purpose, the controller 50 receives, as control input data, a target magnet temperature 40, the number of divided magnets 42, and the rotational speed 44 of the rotating electrical-machine. Although data transmitted from a rotational speed sensor of the rotating electrical-machine 20 can be used as the rotational speed 44, the rotational speed of the rotating electrical-machine 20 which is acquired by converting vehicle speed data transmitted from a vehicle speed sensor (not shown) may also be used. Because the number of divided magnets 42 is specific to the rotating electrical-machine 20, the number of divided magnets 42 can be given as a fixed value in advance after the rotating electrical-machine is determined. If the target magnet temperature 40 is set corresponding to the rotational speed 44, data associated with the rotational speed 44 can be transmitted; while if the target magnet temperature 40 is set to be a predetermined value which does not correspond to the rotational speed 44, the predetermined value may also be given as a fixed value in advance. The above controller 50 can be composed of an appropriate computer such as, for example, a computer suitable to be mounted on a vehicle.

The controller 50 is configured to include a condition acquisition processing unit 52 which acquires the target magnet temperature 40 as a condition, a rotational speed acquisition processing unit 54 which also acquires the rotational speed 44 as a condition, and a carrier frequency setup processing unit 56 which acquires a relationship among the number of divided magnets n, a magnet temperature $T_M$, and a carrier frequency f in advance, acquires the carrier frequency f corresponding to the target magnet temperature 40, the number of divided magnets 42, and the rotational speed 44 based on the relationship, and supplies the carrier frequency f to the inverter control unit 48.

The above function can be realized by executing software, and specifically, by executing a portion of a rotating electrical-machine control program which relates to setup a carrier frequency. Part of the above function may also be realized by hardware.

The storage unit 60 has a function of storing the rotating electrical-machine control program, etc., and here it has, in particular, a function of storing a relation file 62 indicating the above relationship among the number of divided magnets n, the magnet temperature $T_M$, and the carrier frequency f.

Figure 3:
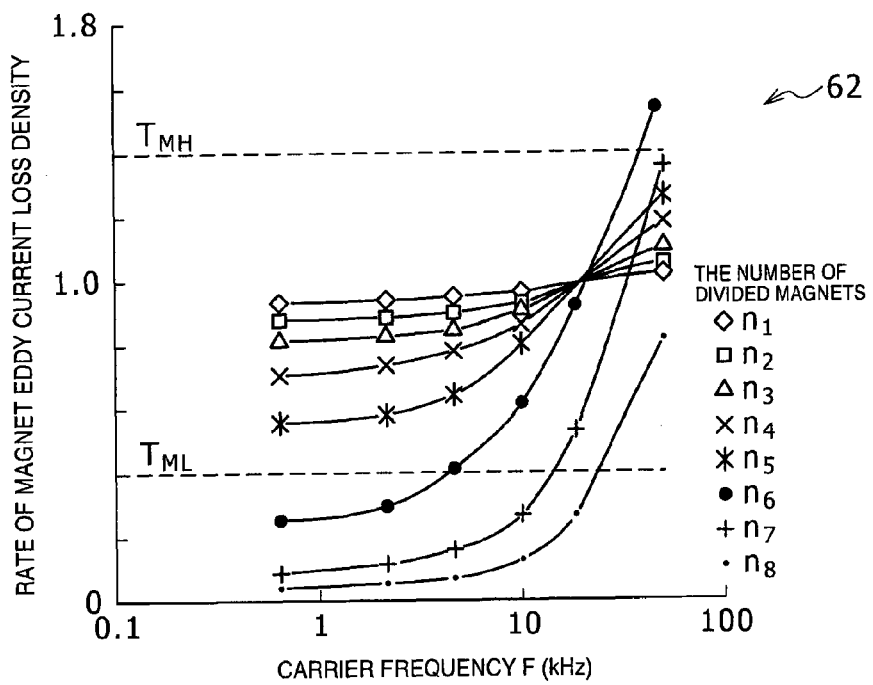
FIG. 3 shows an example of a relationship among the number of divided magnets, a magnet temperature, and a carrier frequency according to the embodiment of the present invention.

FIG. 3 shows an example of contents of the relation file 62. In this figure, the horizontal axis indicates the carrier frequency f, while the vertical axis indicates the rate of magnet eddy current loss density corresponding to the magnet temperature $T_M$. The density of magnet eddy current loss means eddy current loss per unit mass of the magnet. The rate of magnet eddy current loss density means a value which is normalized based on the assumption that a reference density of a magnet eddy current is 1. Therefore, as the rate of magnet eddy current loss density becomes larger, the magnet temperature becomes higher. FIG. 3 also shows the relationships between the magnet temperature $T_M$ and the carrier frequency f with respect to eight numbers, from $n_1$ to $n_8$, each indicating the number of divided magnets n. The magnet is not divided if the number of divided magnets $n_1=1$, and there is a relationship of $n_1<n_2<n_3<n_4<n_5<n_6<n_7<n_8$.

As shown in FIG. 3, when the carrier frequency f is within the range between 1 kHz and 5 kHz, the rate of magnet eddy current loss is substantially constant with respect to the carrier frequency, and within this range, by increasing the number of divided magnets n, the rate of magnet eddy current loss steadily decreases. However, when the carrier frequency exceeds about 5 kHz, the rate of magnet eddy current loss increases as the carrier frequency increases. The rate of increase becomes more significant as the number of divided magnets becomes larger. Then, when the carrier frequency exceeds about 20 kHz, the rate of magnet eddy current loss is adversely increased by increasing the number of divided magnets.

In the related art, even if the carrier frequency f is changed, it is within the range between 1 kHz and 5 kHz, and this range can therefore be referred to as a regular carrier frequency range. Within this range, by increasing the number of divided magnets n, the rate of magnet eddy current loss steadily decreases. In other words, it is possible to suppress eddy current loss and maintain the magnetic flux density by dividing the magnet. FIG. 3 shows the relation file 62 in which the fact that the rate of magnet eddy current loss is adversely increased by increasing the number of divided magnets is reflected, as a result of study of the number of divided magnets n and the rate of eddy current loss of the magnet at the carrier frequency beyond this regular frequency.

The relation file 62 is assumed to be the map form as shown in FIG. 3. The relation file 62 only has to show the relationship among the number of divided magnets n, the magnet temperature $T_M$, and the carrier frequency f, and may also be in a form other than the map form, including, for example, a mathematical formula and a lookup table.

Such a relation file 62 is created by reflecting the simulation results. The process of deriving the relation file 62 from the simulation results will be described using FIG. 4 through FIG. 8. The simulations are performed on one sample magnet which is not divided, that is, which has the number of divided magnets n=1, and another sample magnet having L=10 mm, that is, having the number of divided magnets n=15, on the assumption that the permanent magnet 30 shown in FIG. 2 has $L_0$=135 mm, W=15 mm, and t=4 mm. The sample having L=10 mm corresponds to the number of divided magnets $n_6$ in FIG. 3. The calculation of the simulation is performed by applying an AC magnetic field of the frequency f in the direction of the magnetic field shown in FIG. 2 and acquiring the eddy current density distribution during that time. As the frequency f of the AC magnetic field corresponds to the carrier frequency f in the rotating electrical-machine 20, the frequency f of the AC magnetic field will hereinafter be referred to as the carrier frequency f.

Figure 4:
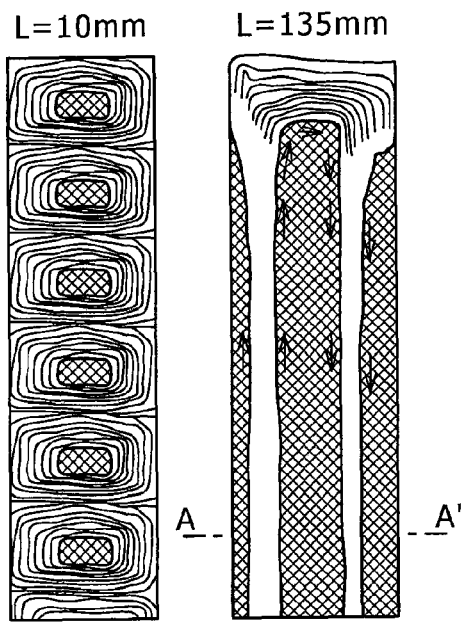
FIG. 4 shows a diagram illustrating an example of a result of a simulation which serves as the basis for the present invention and in which a frequency of a magnetic field is low.
Figure 5:
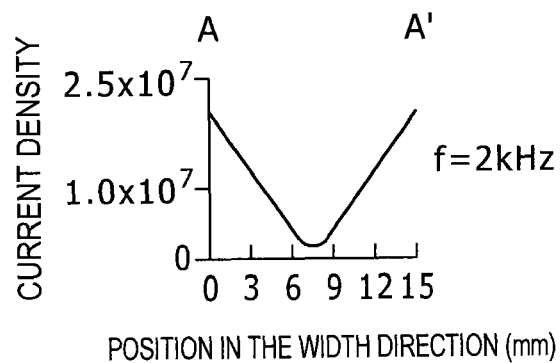
FIG. 5 shows a diagram illustrating a situation of the current density in FIG. 4.

FIG. 4 and FIG. 5 show the result of the simulation performed at a carrier frequency within the so-called regular carrier frequency range. Here, it is assumed that the carrier frequency f=2 kHz. FIG. 4 shows a distribution chart showing the eddy current density distribution, and the white portion corresponds to a portion in which the eddy current flows. The arrow indicates a vector of a current flow. FIG. 5 numerically shows the eddy current density distribution along A-A' in the width direction of the sample having L=135 mm.

According to FIG. 4 and FIG. 5, it is understood that the eddy current decreases toward the center of the eddy monotonously. Therefore, it is understood that the eddy current can be reduced by dividing the magnet. This result is the same as the related art in which the eddy current loss is reduced by dividing the magnet.

Figure 6:
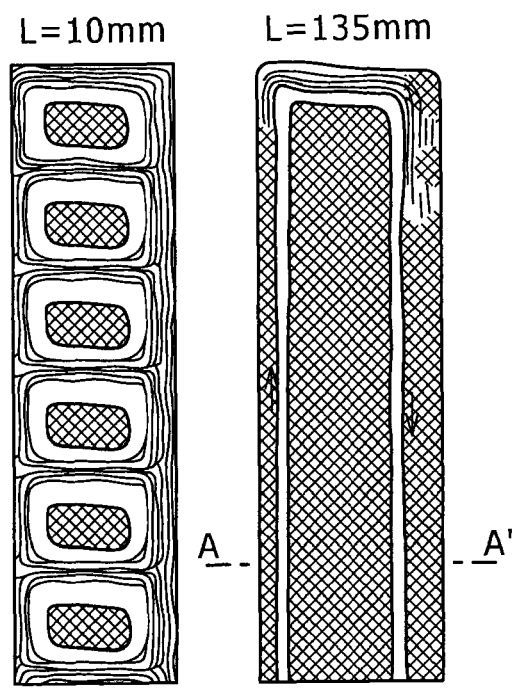
FIG. 6 shows a diagram illustrating an example of a result of the simulation which serves as the basis for the present invention and in which a frequency of a magnetic field is high.
Figure 7:
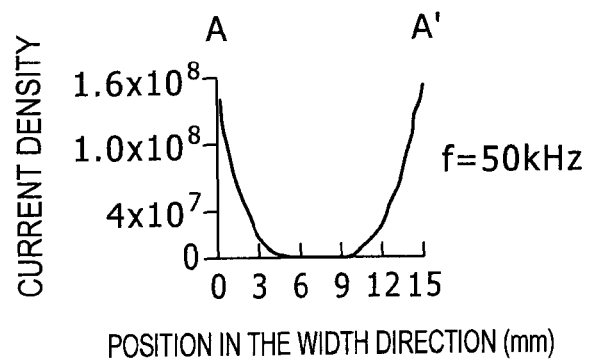
FIG. 7 shows a diagram illustrating a situation of the current density in FIG. 6.

FIG. 6 and FIG. 7 show the result of the simulation performed at a carrier frequency beyond the regular frequency range. Here, it is assumed that a carrier frequency f=50 kHz. FIG. 6 shows a distribution chart showing the eddy current density distribution, and the white portion corresponds to a portion in which the eddy current flows. FIG. 7 numerically shows the eddy current density distribution along A-A' in the width direction of the sample having L=135 mm. As shown in FIG. 6 and FIG. 7, the current is concentrated in the peripheral portion of the magnet. This indicates that when the frequency of the eddy current becomes a high frequency wave, the so-called skin effect is generated, and the eddy current is concentrated on the surface. In other words, compared to FIG. 5, the eddy current density distribution shown in FIG. 7 is more concentrated in the peripheral portion and has values that are greater values by an order of magnitude.

As such, if the eddy current density distribution is concentrated in the peripheral portion as the surface of the magnet, and the current is concentrated due to the skin effect, dividing the magnet results in increasing the circumference length of this current-concentrated path adversely. As a result, the eddy current loss increases. This is considered to be the reason for an adverse increase of the eddy current loss caused by increasing the number of divided magnets when the carrier frequency is beyond the regular carrier frequency range.

Figure 8:
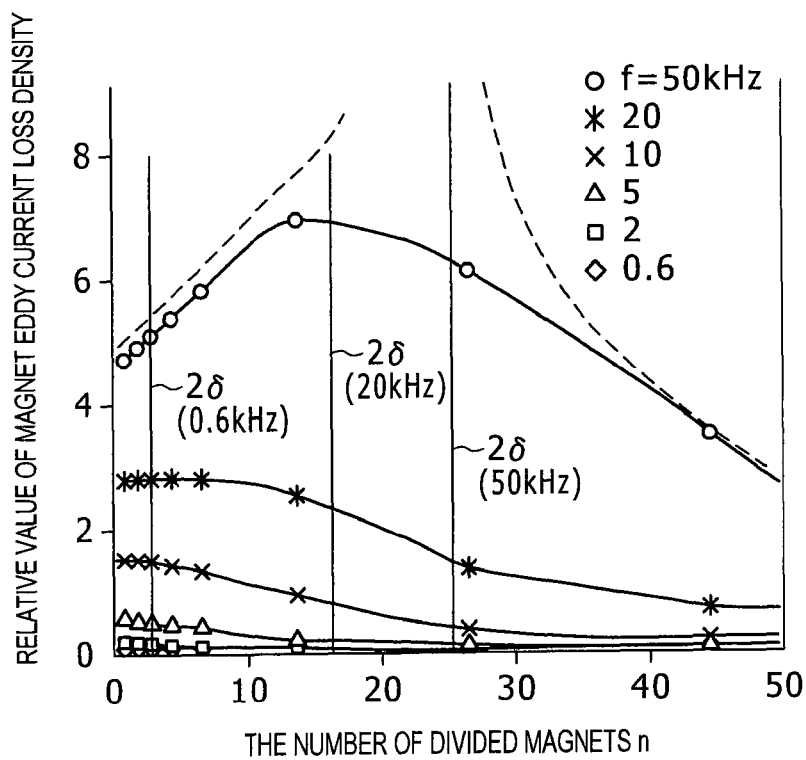
FIG. 8 shows a summary of the results of the simulation which serves as the basis for the present invention.

FIG. 8 shows a summary of the results of the simulations performed by further changing the dividing numbers of magnets in various manners and changing the carrier frequency f in various manners. In this figure, the horizontal axis indicates the number of divided magnets n, while the vertical axis indicates a relative value of the magnet eddy current loss density. Then, six carrier frequencies f, from 0.6 kHz to 50 kHz, are provided as parameters. In FIG. 8, for example, 2δ (20 kHz) indicates the length which is twice as long as the skin depth δ at the carrier frequency f=20 kHz. The skin depth δ is indicated by $\{1/(\pi\mu_0\mu_r\sigma f)\}^{1/2}$, where $\mu_0$ indicates the absolute magnetic permeability of vacuum; $\mu_r$ indicates the relative permeability; σ indicates the electrical conductivity; and f indicates a carry frequency of a vacuum.

In this figure, as it is assumed that $L_0$=135 mm, 2δ corresponding to the respective carrier frequencies f are indicated at the corresponding number of divided magnets. This 2δ point is provided as a reference indicating that, in theory, the eddy current loss is maximized at the point where the skin depth δ is doubled because the eddy current loss increases when the circumference length of the current-concentrated path increases due to the skin effect described in FIG. 6.

As shown in FIG. 8, within the range of a regular carrier frequency in which a carrier frequency f is low, by increasing the number of divided magnets n, the eddy current loss density steadily decreases. However, at a carrier frequency f beyond the regular carrier frequency range, the eddy current loss density is maximized at a certain number of divided magnets, as typically observed at f=50 kHz. In other words, by increasing the number of divided magnets, the eddy current loss density is adversely increased. The carrier frequency f at which the eddy current loss density is maximized is shifted on the higher frequency side as the number of divided magnets increases.

In other words, when the number of divided magnets is too large, the eddy current loss density increases as the carrier frequency increases more than a carrier frequency corresponding to the optimal number of divided magnets. When the eddy current loss density increases, the magnet temperature increases. FIG. 3 is based on the result shown in FIG. 8, but in FIG. 3, the horizontal axis is changed to indicate a carrier frequency, while the vertical axis is changed to indicate the rate of the eddy current loss density, and the number of divided magnets is replaced with parameters.

Returning to FIG. 3, the functions of the above-described configuration will be described. While the rotating electrical-machine 20 is in operation, or while the vehicle runs, the target magnet temperature 40 and the rotational speed 44 are acquired. Because the number of divided magnets 42 is specific to the rotating electrical-machine 20 and is known in advance, a value of the number can be stored in, for example, an appropriate memory and then used. This condition acquiring step is executed by the condition acquisition processing unit 52 and the rotational speed acquisition processing unit 54 of the controller 50. For example, if the acquired rotational speed is low, it is desirable to rotate the rotating electrical-machine 20 at low rotational speed and high torque. This corresponds to an urban area running state of the vehicle. As such, while the rotating electrical-machine 20 is operated at the low rotational speed and the high torque, as the magnetic flux density is higher, the high torque can be produced more easily, and the efficiency of the rotating electrical-machine 20 is better.

Because the permanent magnets 30 and 31 have high-temperature demagnetization characteristics as described above, a target magnet temperature is set to be $T_{ML}$ on the low temperature side so that that the magnetic flux density becomes large. Then, by using the given number of divided magnets n of the permanent magnets 30 and 31, it is possible to acquire a carrier frequency f corresponding to this $T_{ML}$. In FIG. 3, when it is assumed that the number of divided magnets is $n_6$, a carrier frequency f of about 5 kHz can be acquired.

In contrast, if the acquired rotational speed is high, it is desirable to operate the rotating electrical-machine 20 at high rotational speed and low torque. This corresponds to a highway running state of the vehicle. As such, while the rotating electrical-machine 20 is operated at the high rotational speed and the low torque, as the magnetic flux density is lower, the iron loss is smaller, and the efficiency of the rotating electrical-machine 20 is better. Because the permanent magnets 30 and 31 have high-temperature demagnetization characteristics as described above, the target magnet temperature is set to be $T_{MH}$ on the high temperature side so that that the magnetic flux density becomes small. Then, by providing this number of divided magnets n of the permanent magnets 30 and 31, it is possible to acquire a carrier frequency f corresponding to this $T_{MH}$. In FIG. 3, when it is assumed that the number of divided magnets is $n_6$, a carrier frequency f of about 40 kHz can be acquired.

As such, by using the relation file 62, it is possible to acquire a carrier frequency f which achieves an optimal magnet temperature according to the operational state the rotating electrical-machine 20 or the running state of the vehicle. The acquired carrier frequency f is transmitted to the inverter control unit 48, to thereby cause the inverter circuit 18 to perform PWM control based on this carrier frequency f. This series of steps can be referred to collectively as a carrier frequency setup step, and are performed by the function of the carrier frequency setup processing unit 56 of the controller 50. As such, by changing the carrier frequency f corresponding to the number of divided magnets n according to the operational state of the rotating electrical-machine, it is possible to manipulate the magnet temperature and change the magnetic flux density of the divided magnets. Because the relation file 62 is also associated with the number of divided magnets 42, the same relation file 62 can be used for another rotating electrical-machine 20 having a different number of divided magnets 42.

INDUSTRIAL APPLICABILITY

The rotating electrical-machine control system according to the present invention can be used for control of the rotating electrical-machine having the permanent magnets.

REFERENCE SIGNS LIST

10 rotating electrical-machine control system, 12 power circuit, 14 electrical storage device, 16 voltage converter, 18 inverter circuit, 20 rotating electrical-machine, 22 stator, 24 slot, 26 rotor, 28 rotating shaft, 30 and 31 permanent magnets, 34 divided magnets, 36 eddy current, 40 target magnet temperature, 42 the number of divided magnets, 44 the rotational speed, 48 inverter control unit, 50 controller, 52 condition acquisition processing unit, 54 the rotational speed acquisition processing unit, 56 carrier frequency setup processing unit, 60 storage unit, 62 relation file.

The invention claimed is:

1. A rotating electrical-machine control system comprising:

a rotating electrical-machine having a rotor including divided magnets;

an inverter circuit which drives the rotating electrical-machine by PWM control using a carrier wave having a carrier frequency;

a condition acquisition processing unit which acquires a target magnet temperature of the magnets of the rotating electrical-machine;

a storage unit which stores a relationship among the number of divided magnets, a magnet temperature, and the carrier frequency; and a carrier frequency setup processing unit which provides the number of divided magnets and the target magnet temperature to thereby search the storage unit, and sets a corresponding carrier frequency as a carrier wave frequency of the inverter circuit.

2. The rotating electrical-machine control system according to claim 1, wherein:

the rotating electrical-machine comprises the magnets having high-temperature demagnetization characteristics;

a rotational speed acquisition processing unit which acquires the rotational speed of the rotating electrical-machine is further provided; and the carrier frequency setup processing unit sets a higher target magnet temperature as the rotational speed increases.

3. A method for operating a magnet temperature of a rotating electrical-machine, the method comprising:

a condition acquiring step of acquiring a target magnet temperature of a magnet of the rotating electrical-machine; and a carrier frequency setup step of providing a number of divided magnets and the target magnet temperature, searching a storage unit storing a relationship among the number of divided magnets, a magnet temperature, and a carrier frequency, and setup a corresponding carrier frequency as a carrier wave frequency of an inverter circuit connected to the rotating electrical-machine.

4. The method of operating the magnet temperature of the rotating electrical-machine according to claim 3, wherein in the carrier frequency setup step, a carrier frequency provided when the rotating electrical-machine is at a high rotational speed and a low torque is set differently from a carrier frequency provided when the rotating electrical-machine is at a low rotational speed and a high torque.

* * * * *